United States Patent [19]
Longster et al.

[11] Patent Number: 6,005,922
[45] Date of Patent: Dec. 21, 1999

[54] VOICE MAIL SYSTEM AND METHOD OF INTER-VOICE MAIL SYSTEM COMMUNICATION

[75] Inventors: Gary Longster, St. Catherines; Janusz Maruszak, Stoney Creek; Mervyn D'Cruz, Concord; Brian Oliver, Aurora, all of Canada

[73] Assignee: Nortel Networks Corporation, Montreal, Canada

[21] Appl. No.: 08/966,386

[22] Filed: Nov. 7, 1997

Related U.S. Application Data

[60] Provisional application No. 60/029,993, Nov. 12, 1996.

[51] Int. Cl.⁶ .................................................. H04M 1/64
[52] U.S. Cl. ...................................... 379/88.18; 379/88.17
[58] Field of Search ............................ 379/67.1, 88.13, 379/88.14, 88.17, 88.18, 88.22, 88.25, 88.27

[56] References Cited

U.S. PATENT DOCUMENTS

| | | | |
|---|---|---|---|
| 5,572,578 | 11/1996 | Lin et al. | 379/89 |
| 5,608,783 | 3/1997 | Ichnowski et al. | 379/67 |
| 5,684,862 | 11/1997 | Finnigan | 379/88.22 |
| 5,687,220 | 11/1997 | Finnigan | 379/211 |

OTHER PUBLICATIONS

Audio Messaging Interchange Specification (AMIS) – Analog Protocol Version 1, Issue 2: Feb. 1992.

*Primary Examiner*—Fan S. Tsang

[57] ABSTRACT

A method of exchanging voice mail messages between voice mail systems is disclosed. A voice mail system employing the method is also disclosed. The method comprises establishing a message exchange session between a first and second voice mail system. Information about features offered at each system is exchanged between the systems. Using this information the features that are common to both systems are determined. Thereafter, message data used only by features common to both systems is exchanged.

13 Claims, 8 Drawing Sheets

PROTOCOL EXTENSION ACCEPT RESPONSE FRAME DEFINITION /38

| Fields | Number of Digits | Functions | Data Range | Comment | |
|---|---|---|---|---|---|
| 1 | 2 | Frame Length | (18-30) | The frame length | 42a |
| 2 | 1 | Response Code | 0 | Accept response code | 42b |
| 3 | 5 | Feature Bitmap | 00000-65535 | Features supported for this session | 42c |
| 4 | 1 | Version Number | 1 | Receiving version | 42d |
| 5 | 8 to 20 | Responding Password | (00-95) for each character | Refer to Appendix A | 42e |
| 6 | 1 | Delimiter | # | End of Password | 42f |
| 7 | 2 | Checksum | (00-99) | | 42g |

PROTOCOL EXTENSION DATA FRAME DEFINITION ← 18

| Fields | Number of Digits | Functions | Data Range | Comment | |
|---|---|---|---|---|---|
| 1 | 2 | Frame Length | (21-33) | | ⌐ 40a |
| 2 | 1 | Function Code | 8 | Protocol Extension | ⌐ 40b |
| 3 | 3 | Receiving Site ID | (001-500) | Valid site ID: 1-500 | ⌐ 40c |
| 4 | 5 | Feature Bitmap | 00000-65535 | Used to decide what features to support | ⌐ 40d |
| 5 | 1 | Version Number | 1 | Sending site version | ⌐ 40e |
| 6 | 8 to 20 | Initiation Password | (00-95) of each character | 4 to 10 characters | ⌐ 40f |
| 7 | 1 | Delimiter | # | End of Password | ⌐ 40g |
| 8 | 2 | Checksum | (0-99) | | ⌐ 40h |

FIG. 3

PROTOCOL EXTENSION ACCEPT RESPONSE FRAME DEFINITION ← 38

| Fields | Number of Digits | Functions | Data Range | Comment | |
|---|---|---|---|---|---|
| 1 | 2 | Frame Length | (18-30) | The frame length | ⌐ 42a |
| 2 | 1 | Response Code | 0 | Accept response code | ⌐ 42b |
| 3 | 5 | Feature Bitmap | 00000-65535 | Features supported for this session | ⌐ 42c |
| 4 | 1 | Version Number | 1 | Receiving version | ⌐ 42d |
| 5 | 8 to 20 | Responding Password | (00-95) for each character | Refer to Appendix A | ⌐ 42e |
| 6 | 1 | Delimiter | # | End of Password | ⌐ 42f |
| 7 | 2 | Checksum | (00-99) | | ⌐ 42g |

FIG. 4

MESSAGE DETAIL DATA FRAME DEFINITION /20

| Fields | Number of Digits | Functions | Data Range | Comment |
|---|---|---|---|---|
| 1 | 2 | Frame Length | 22-80 | |
| 2 | 2 | Function Code | 63 | Message Detail command |
| 3 | 2 | Message Type | (00-50) | |
| 4 | 2 | Message Body Length | (00-99) | In Minutes |
| 5 | 1 | Message Tag | (0-3) | 0 = normal<br>1 = private message<br>2 = urgent message<br>3 = private & urgent<br>4-9 = are unused |
| 8 | 2 | Sent-at-day | (01-31) | |
| 7 | 2 | Sent-at-month | (01-12) | |
| 6 | 2 | Sent-at-year | (00-99) | |
| 9 | 2 | Sent-at-hour | (00-23) | |
| 10 | 2 | Sent-at-minute | (00-59) | |
| 11 | 2 | Sent-at-second | (00-59) | |
| 12 | 0-58 | Subject | (00-95)/char | Optional, up to 29 characters. |
| 13 | 1 | Delimiter | # | End of Subject |
| 14 | 2 | Checksum | (00-99) | |

SENDER INFORMATION DATA FRAME DEFINITION ← 22

| Fields | Number of Digits | Functions | Data Range | Comment | |
|---|---|---|---|---|---|
| 1 | 2 | Frame Length | (13-67) | | 50a |
| 2 | 2 | Function Code | 60 | Sender Information | 50b |
| 3 | 1 | Spoken Name | 0 = Don't add the sender as an RVU<br>1 = Add sender as an RVU but there is no spoken name to record<br>2 = Add sender as an RVU and prepare to record a spoken name<br>3-9 = Not Used | Indicates whether to add/update the sender as an RVU and whether there is a spoken name to record | 50c |
| 4 | 2 | Address Type | (00-15) | Types of Address | 50d |
| 5 | 2 | Location Number | (00-59) | Valid location ID range | 50e |
| 6 | 2-18 | Sender's Mailbox | (0-9) of each | variable length | 50f |
| 7 | 1 | Delimiter | # | End of mailbox number | 50g |
| 8 | 0-38 | Sender's Name | (00-95) of each character | 2 digits per character | 50h |
| 9 | 1 | Delimiter | # | End of Sender Name | 50i |
| 10 | 2 | Checksum | (00-99) | | 50j |

FIG. 7

RECIPIENT INFORMATION DATA FRAME DEFINITION /24

| Fields | Number of Digits | Functions | Data Range | Comment | |
|---|---|---|---|---|---|
| 1 | 2 | Frame Length | 15-69 | | 52a |
| 2 | 2 | Function Code | (61-62) | 61-Recipient info 62-Last Recipient info | 52b |
| 3 | 2 | Address Type | 00-15 | Types of address | 52c |
| 4 | 3 | Site ID | (001-500) | Valid site ID: 1-500 | 52d |
| 5 | 2 | Location Number | (00-59) | Valid location ID range | 52e |
| 6 | 2-18 | Mailbox Number | (0-9) for each digit | Variable size | 52f |
| 7 | 1 | Delimiter | # | End of mailbox number | 52g |
| 8 | 0-38 | Recipient Name | (00-95) for each character | 2 digits per character | 52h |
| 9 | 1 | Delimiter | # | End of recipient's name | 52i |
| 10 | 2 | Checksum | (00-99) | | 52j |

FIG. 8

TIME STAMP DATA FRAME DEFINITION /26

| Fields | Number of Digits | Functions | Data Range | Comment | |
|---|---|---|---|---|---|
| 1 | 2 | Frame Length | 16 | | 54a |
| 2 | 2 | Function Code | 65 | Time Stamp | 54b |
| 3 | 2 | Day | (01-31) | | 54c |
| 4 | 2 | Month | (01-12) | | 54d |
| 5 | 2 | Year | (00-99) | | 54e |
| 6 | 2 | Hour | (00-23) | | 54f |
| 7 | 2 | Minute | (00-59) | | 54g |
| 8 | 2 | Second | (00-59) | | 54h |
| 9 | 2 | Checksum | (00-99) | | 54i |

FIG. 9

NDN RECIPIENT INFORMATION DATA FRAME DEFINITION /32

| Fields | Number of Digits | Functions | Data Range | Comment | |
|---|---|---|---|---|---|
| 1 | 2 | Frame Length | 11-27 | | 56a |
| 2 | 2 | Function Code | (66-67) | 66 = NDN Recipient info<br>67 = NDN Last Recipient info | 56b |
| 3 | 2 | Address Type | (00-15) | Types of address | 56c |
| 4 | 2 | Location Number | (00-59) | Valid location ID range | 56d |
| 5 | 2-18 | Mailbox Number | (0-9) for each digit | Variable size | 56e |
| 6 | 1 | Delimiter | # | End of mailbox number | 56f |
| 7 | 2 | Checksum | (00-99) | | 56g |

ATTACHMENT INFORMATION DATA FRAME DEFINITION

| Fields | Number of Digits | Functions | Data Range | Comment | |
|---|---|---|---|---|---|
| 1 | 2 | Frame Length | 6 | | 58a |
| 2 | 2 | Function Code | 64 | Attachment info command | 58b |
| 3 | 2 | Attachment Length | (00-99) | Data in minutes | 58c |
| 4 | 2 | Checksum | (00-99) | | 58d |

FIG. 11

VOICE MAIL SYSTEM AND METHOD OF INTER-VOICE MAIL SYSTEM COMMUNICATION

CROSS-REFERENCE TO RELATED APPLICATIONS

This application claims the benefit of U.S. provisional application No. 60/029,993 filed Nov. 12, 1996, the contents of which are incorporated by reference herein.

FIELD OF THE INVENTION

The present invention relates to voice mail systems, and more particularly to a method of exchanging voice mail messages between systems.

BACKGROUND OF THE INVENTION

Present telephone voice mail ("VM") systems provide users with voice mail accounts ("voice mailboxes"). Message senders may send telephone voice messages to recipients having voice mailboxes. The voice mailboxes allow the sender to store the voice messages intended for the recipient, on the recipient's VM system. The intended recipient may later replay the sender's message.

Message senders may be classified as local senders that have voice mailboxes on the recipient's VM system; remote senders that have a voice mailboxes on another VM system; or as remote senders that are otherwise connected to the public telephone network, but not connected to a VM system.

Present-day VM systems allow local senders to compose and send messages to other local recipients on the same VM system, while taking advantage of features provided by the VM system. For example, a sender may compose a message prior to sending. Similarly, a local sender may associate non-voice data with a message. This other data may include, for example, a message reply request; text data; sender identifying data; time of message data; and data to link other messages (attachments).

Remote senders that do not send messages from the recipient's VM system, typically cannot take advantage of all available VM system features. Some VM systems make a subset of the features available to callers calling the recipient's VM system through the public telephone network. Features of the VM system that do not require that a sender to have a voice mailbox are made available through a series of voice prompts. For example, an outside caller may call a recipient's VM system and compose a message before sending it to the recipient. Similarly, an outside caller may mark a composed message as urgent. Data is associated with such a message, allowing the VM system to indicate the message is urgent when it is replayed.

Other VM systems allow the transparent exchange of messages including messaging data and voice data between VM systems. Two or more physically separate VM systems of this type may be integrated. Remote users on each of the VM system may exchange messages across VM systems and take advantage of VM system features across the integrated systems. Messages destined for a remote recipient may be sent as if the recipient's voice mailbox were local to the senders' VM system. Messaging data required to implement features offered by the sender and recipient VM systems is exchanged between the VM systems along with voice data.

For example a sender having a voice mailbox on a first VM system composes and dispatches a message destined for a recipient on a second system. The sender associates a piece of data with the message indicating that the message is urgent. The sender may identify the recipient on the sender's VM system using an abbreviated identifier. Possibly, the abbreviated identifier appears as an extension. Some time later, after the sender has composed and dispatched the message, the first and second VM system establish a message exchange session. The sender's voice message is exchanged by first forming message data comprised of voice data and messaging data. These are sent from the first VM system to the second VM system during the exchange session. As well, other messages dispatched by other users on the first VM system are similarly exchanged during the session. The recipient's VM system receives the message data and, if possible, stores the voice data and any relevant associated messaging data in the recipient's mailbox. The recipient's VM system then treats the message like any other message originating on the recipient VM system. Thus, the recipient's system properly identifies associated data to advise the recipient that the message has been labelled as urgent. Other messaging data may similarly be exchanged. Moreover, messaging data generated in response to the receipt of a voice mail message may be sent back to the originating system during another exchange session.

Message data, including voice data and messaging data, may be exchanged between VM systems using a standardized protocol. One such protocol, known as the AMIS-Analog protocol ("AMIS-A") is supported by numerous VM system vendors and is described in the "Audio Messaging Interchanging Specification (AMIS)—Analog Protocol Version 1, Issue 2", as published in February 1992 by the Information Industry Association in Washington D.C. The AMIS-A protocol provides a method to exchange messages by establishing an exchange session using the public telephone network. Voice message data is sent in analog format during the session. Associated messaging data is sent using conventional dual tone multi frequency ("DTMF") signals.

While digital protocols are known, the use of an analog protocol, including the use of DTMF signals allows for the exchange of messages using conventional voice telephone lines, without requiring digital modem grade lines, not readily available in certain parts of the world.

The existing AMIS-A protocol, however, only supports the most commonly used VM system functions—sending, receiving, and replying to messages. Systems adhering to the AMIS-A protocol are required to provide these minimum functions. The protocol, and the methods implemented using the protocol do not support many VM system functions common to present-day VM systems.

While the AMIS-A protocol does contemplate protocol extensions, neither the nature of the extensions, nor their implementation are defined by the protocol. Moreover, difficulties associated with extending the protocol are not contemplated.

SUMMARY OF THE INVENTION

It is an object of the present invention to provide an enhanced method of exchanging messages between VM systems having varied features.

Advantageously, the present invention may decrease the amount of time required to exchange messages between two VM systems by not sending data not used by features supported by both system. Moreover, the present invention allows message data used by the largest set of common features supported by both systems to be exchanged, thereby maximizing features available across VM systems.

In accordance with an aspect of the present invention, there is provided a method of exchanging voice mail messages between a first and second voice mail system, each voice mail message comprising frames of message data, the method comprising the steps of: a) establishing a message exchange session between the first and second system; b) sending a first indicator of available voice mail system features at the first system, from the first system to the second system; c) sending a second indicator of available voice mail features at the second system from the second system to the first system; d) determining at the first and second systems a largest set of common features available at both the first and second systems; and e) exchanging frames of message data used only by features in the set of common features.

In accordance with another aspect of the present invention, there is provided a voice mail system, for interconnection with a second voice mail system, comprising an interface for connecting the voice mail system for communication with the second voice mail system; a processor in communication with the interface, the processor adapted to exchange voice mail messages with the second voice mail system through the interface, the processor adapted to a) establish a message exchange session with the second voice mail system; b) send a first indicator of available voice mail system features at the voice mail system, to the second voice mail system; c) receive a second indicator of available voice mail features at the second voice mail system from the second voice mail system; d) determine a largest set of common features available at both the voice mail systems and the second voice mail system; and e) exchange frames of message data used only by features in the set of common features with the second voice mail system.

BRIEF DESCRIPTION OF THE DRAWING

In figures which illustrate preferred embodiments of the invention,

FIG. 3 illustrates the format of a data frame illustrated in FIG. 2;

FIG. 4 illustrates the format of a frame of data sent from the recipient VM system to the sending VM system in accordance with an aspect of the present invention;

FIGS. 6–11 illustrate the format of various data frames illustrated in FIG. 2.

DETAILED DESCRIPTION

Figure 1:
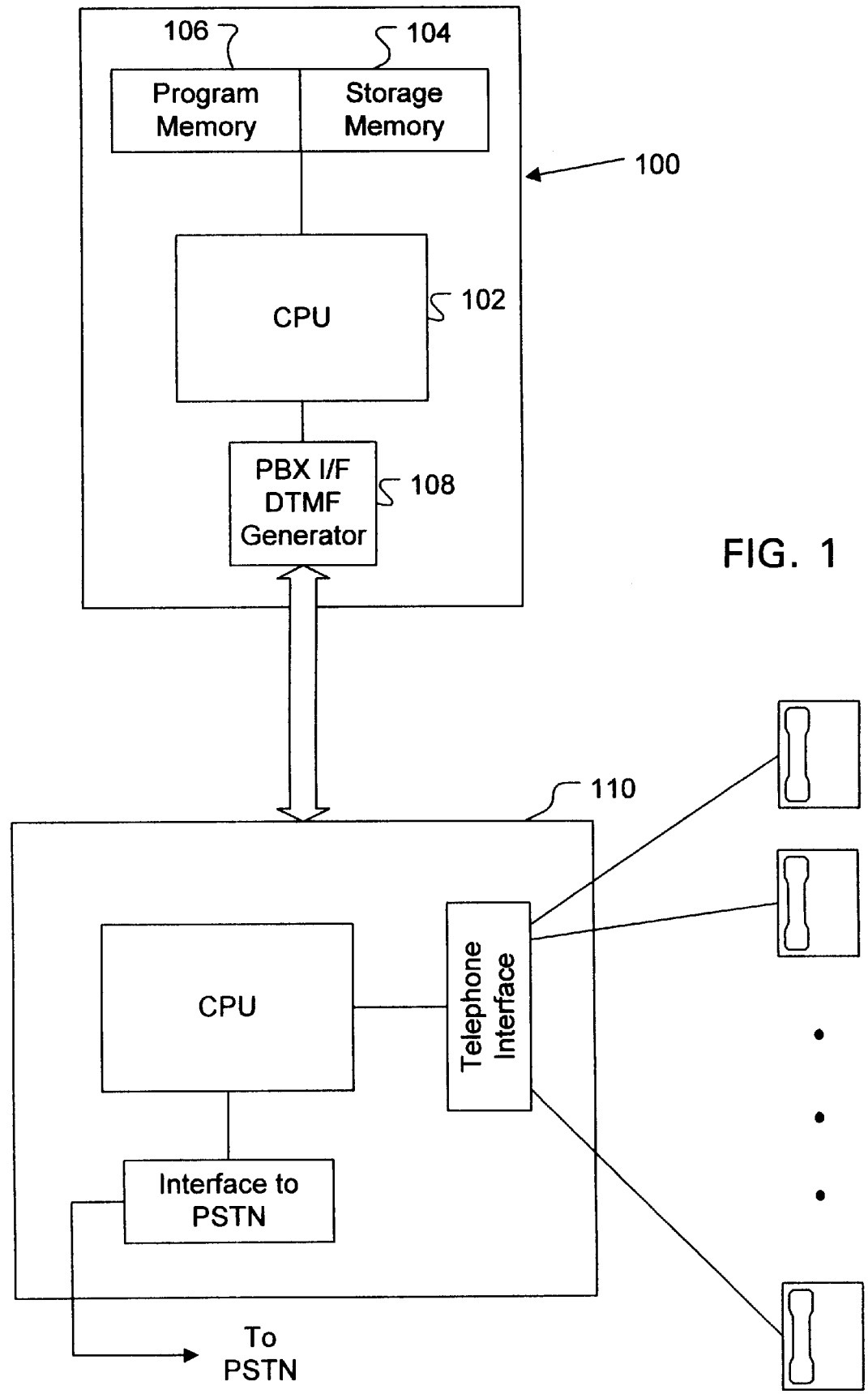
FIG. 1 is a block diagram of a VM system, in accordance with an aspect of the present invention.

As illustrated in block diagram in FIG. 1, a sending VM system 100 is connected to a telecommunications switch such as a private branch exchange ("PBX") 110 which is connected to another recipient VM system (not shown) through a switched telephone network. The VM systems may be interconnected through the public switched telephone network ("PSTN") by conventional voice telephone lines, or through a private network. Interface 108 connects sending VM system 100 to the PBX.

VM system 100 is controlled by a central processor ("CPU") 102, under software control. CPU 102 is interconnected with program and storage memories 106, 104 and interface 108. Processor readable versions of the software are stored in program memory 106. The software controls the overall functionality of the VM system 100, and adapts the processors in the VM system 100 to carry out the methods in accordance with the present invention. The interconnected VM system (not shown) is similarly adapted to communicate with VM system 100 using methods in accordance with the present invention.

The software provides each user on VM system 100 with an account, allowing that user to receive, store and retrieve voice messages from storage memory. As well, a user can compose messages, store them in memory and send these messages to others. Users have local phone connections to system 100 through PBX 110, also in communication with CPU 102.

The software controlling VM system 100 and the interconnected VM system (not shown) also implements the AMIS-A protocol, and allows the exchange of voice messages in the form of message data between the VM systems. As well, both VM systems may exchange message data with other VM systems that support the AMIS-A protocol. The exchanged message data comprises voice data and associated messaging data. Using the message data, the software can make the existence of two physically distinct VM systems substantially transparent to users of either system.

For example, software allows user mail boxes on both VM systems to be identified by mutually exclusive mail box numbers. Depending on the number of users on related systems, each user mailbox may be identified with an abbreviated three, four or five digit number.

Users having a voice mailbox on a first system may send recipients on the second system messages by composing the message on the first system, and dispatching the message to users on the second system. At a later time, software controlling the two systems causes the VM systems to establish a message exchange session. During the message exchange session, message data, destined for users on the other system are exchanged between the systems.

Message data is exchanged between the systems using the AMIS-A protocol as extended in accordance with an aspect of the present invention. Message data flow from a sending VM system 100 to a recipient VM system is illustrated in FIG. 2.

Data is exchanged between the system in frames. Specifically, the sending VM system 100 sends message data for each voice message as a plurality of message frames. The recipient VM system sequentially receives each frame. Once a frame is received, data in the frame is validated by the recipient VM system. If there is a problem with a received frame, the recipient VM system requests the frame to be resent, up to three times for each frame. If the frame is properly received, the recipient VM system sends a response frame and waits for the next data frame. The exchange session is terminated if the recipient VM system does not receive a frame successfully within three attempts.

Figure 2:
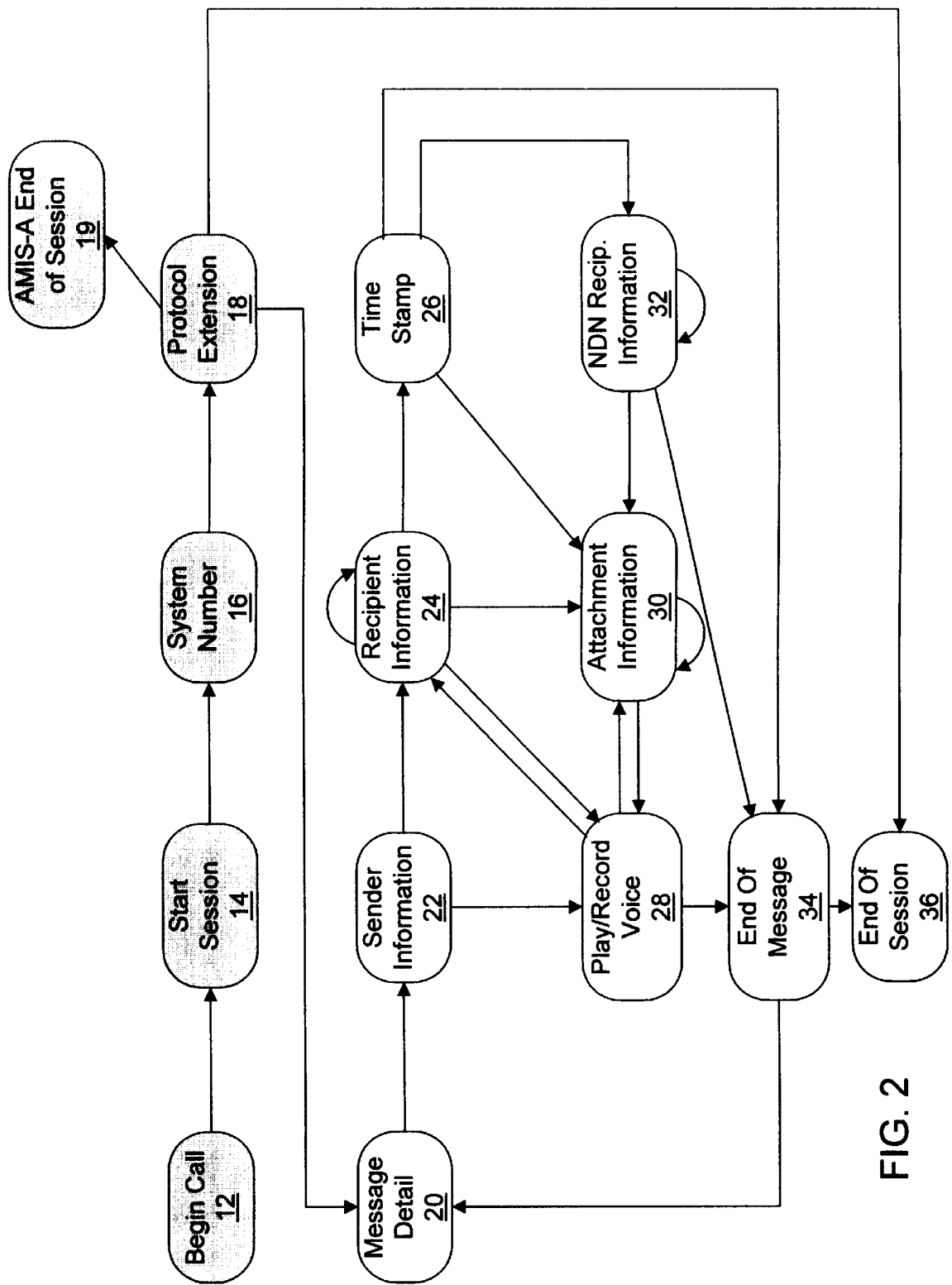
FIG. 2 depicts frames of message data exchanged from a sending VM system to a recipient VM system, in accordance with an aspect of the present invention.

Each node in FIG. 2 represents a frame of data, generated or identified and sent by the software controlling the sending VM system 100. With the exception of frames of voice data 28, the message data is encoded and sent in DTMF tones. The DTMF tones may be generated by PBX 110 or at interface 108. The recipient VM system receives and decodes the DTMF tones. Voice data is sent as analog data, by replaying a stored analog voice signal. The sent analog signal is recorded by the recipient VM system.

A message exchange session is initially established by sending begin call; start session; and session number frames 12, 14 and 16. The format of begin call; start session; and system number frames 12, 14 and 16 as well as AMIS-A end session data frame 19 are defined by the AMIS-A protocol. Frame 18, is referred to as "protocol extension" frame. The format of the protocol extension frame 18 is at least partially defined by the AMIS-A protocol. This frame 18 advises the recipient VM system that the format of the remaining data frames in the session is not defined by the AMIS-A protocol.

The format of protocol extension data frame 18 is illustrated in FIG. 3. A protocol extension data frame 18 is sent once per message exchange session between the VM systems. Frame 18 is divided into eight fields 40a–40h. Each field consists between one and twenty digits.

Field 40a is a two digit identifier, identifying the length of frame eighteen (between twenty-one and thirty-three digits excluding field 40a). One digit field 40b identifies the frame as a protocol extension frame, with a value of 8. Three digit field 40c identifies the recipient VM system. Field 40d contains a five digit feature bitmap, as described below. One digit field 40f contains a software version number identifying the version of software used by the sending VM system 100. Should the two communicating VM systems use different version of the software, they may revert back to the protocol supported by an earlier version of the software. Variable length field 40e contains an initiating password, sent by the sending VM system 100 and verified by the recipient VM system. Single digit field 40g always contains the DTMF "#" character and acts as a delimiter, indicating the end of field 40f. Two digit field 40h contains a two digit checksum for frame 18, used to verify the integrity of the frame as received by the recipient VM system.

In response to receiving frame 18, the recipient VM system sends a response frame, including a response code. If the response frame indicates that the protocol extension frame 18 has not been accepted, the format of the frame is defined by the AMIS-A protocol. Numerous response code values are supported (RC values). For example, an RC3 signifies that the destination site ID in the request protocol was incorrect; an RC4 indicates that the initiating password was invalid; or an RC5 that the feature bitmap was invalid.

If the protocol extension frame 18 is recognized, the recipient system sends a protocol extension accept response frame (not illustrated in FIG. 2) to the sending VM system 100. The format of this frame, marked generally as 38, is illustrated in FIG. 4. It is worth noting that the protocol extension accept response frame 38, unlike other response frames described herein, is not defined by the AMIS-A protocol.

The protocol extension accept response frame 38 consist of seven fields and comprises between twenty and thirty digits. Two digit field 42a indicates the length of each frame 38 excluding field 42a. Field 42b contains a one digit "0" response code. Field 42c comprises a five digit session feature bitmap as more particularly describe below. Field 42d comprises a one digit software version number indicative of the software version used by the recipient system. Variable length field 42e contains a variable length responding password. Field 42f, contains a password delimiter. Finally, field 42g contains a two digit checksum for frame 38.

Figure 5:
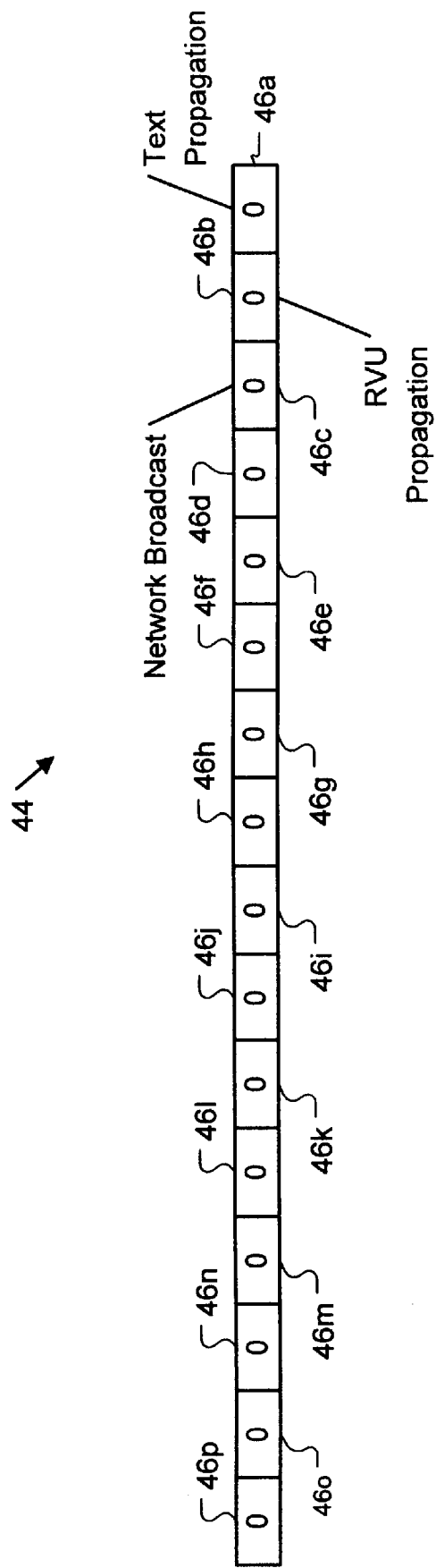
FIG. 5 illustrates the format of a feature bitmap, used in accordance with an aspect of the present invention.

The format of the feature bitmaps sent in field 40d is illustrated in FIG. 5. As illustrated, each feature bitmap, generally identified by the number 44 comprises sixteen boolean elements 46a–46p. Each of these boolean elements may have a value of one or zero, and may signify the support of a single VM system feature supported by the sending or recipient VM system and its software. As will be appreciated, software in either system may be configured to selectively offer all, some, or none of the potentially available features.

For example, each VM system may support the sending of text data along with recorded analog voice messages (referred to as "Text Propagation"). The text data may include ASCII encoded characters corresponding to the sender's name; the recipients' names; and the subject of the message. This data may be used by another computer application in communication with the VM system such as the Nortel™ ACCESS™ applications.

Similarly, each VM system may support sending information about remote users ("RVU propagation"). For example, the sender's text name (as ASCII codes) may be sent from one VM system to the other as part of the message. Similarly, a spoken version of the sender's name may be sent with the message. The recipient VM system may add information about the sender to a local database, and may later use this information.

Additionally, each VM system may support the broadcasting of received messages to all users on the VM system ("Network Broadcast").

In the preferred embodiment, the support of each of these features, Text Propagation, RVU propagation, and Network Broadcast is represented by a single bit in the feature bitmap of the sending or recipient VM system, as illustrated in FIG. 5. In a preferred embodiment all three features are available. Each of the features may, however, be selectively supported. If a feature is supported, the system feature bitmap, established by the software controlling each VM system, will contain a bit value of 1, for that feature.

As illustrated, entry 46a preferably represents the support of text propagation; entry 46b represents the support of RVU propagation; and entry 46c represents the support of Network Broadcast. Remaining entries 46d–46p are unused, but could represent other features. It will appreciated that if required, the feature bitmap could easily be expanded to contain more than sixteen bits.

Thus, suppose the sending VM system 100 supports RVU propagation and text propagation, while the recipient VM system supports only text propagation. The feature bitmap of the sending VM system 100 would be 0000000000000011, while that of the recipient VM system would be 0000000000000001. These bitmaps are considered sixteen bit binary values.

The sending VM system feature bitmap is converted to a base ten value between 0 and $2^{16}-1$. The resulting decimal value is sent as five DTMF digit by the sending VM system 100 in field 40d. In the example, a value of 00003 is sent in field 40d. The recipient system, upon receipt of the value in field 40d, bitwise logically ANDs this value with its own feature bitmap. The resulting bitmap is referred to as the session bitmap. A five digit DTMF value representing the session bitmap is returned by the recipient VM to the sending VM system 100 in field 42c. Thus, for the example system bitmaps, a resulting session bitmap of 0000000000001 or decimal 00001 is returned to the sending VM system 100, indicating that only text propagation is supported by both systems.

Software in both sending and recipient VM systems will not exchange unnecessary data required only for features not supported by both systems, as reflected by the system feature bitmap. This may significantly reduce the amount of time required to exchange the messages during a session, particularly since the message data is exchanged using DTMF tones, or analog voice signals. Moreover, in the event either the sending or recipient VM system is updated to offer additional features, the updated VM system may insure backward compatibility with older systems by properly utilizing the feature bitmap.

After the protocol extension, and protocol extension accept response frames 18, 38 have been exchanged, and features common to both systems are established, an extended message exchange session has been established. One or more messages, each consisting of messaging data and possibly voice data, may be exchanged during this extended message exchange session.

It is worth noting that the sending VM system 100 does not send a response frame, in response to protocol extension accept response frame 38. Instead, it sends a message detail frame 20, if and only if the protocol extension accept response frame is validly accepted.

Each message is identified by such a message detail frame 20. This is the first frame transferred from the sending VM system 100 to the recipient VM system for each message. Message detail frame 20 has a format as illustrated in FIG. 6. Each message detail frame comprises 20 fourteen fields 48a–48n and has a length of between twenty-four and eighty digits, also sent as DTMF tones. Fields include a two digit frame length field 48a, indicating the total length of each frame 20, excluding field 48a in digits. A two digit function code field 48b indicates the type of frame. A value of 63 identifies a message detail frame 20. A further message type field 48c indicates the type of message being sent (ie. whether the current message is a regular, acknowledgment, or non-delivery-notification ("NDN") message as detailed below). A two digit message body length field 48d indicates the length of the voice portion of the current message being sent (if any), in minutes from between 00 and 99 minutes. As will become apparent, for acknowledgement messages or forwarded messages this length may be zero. Field 48e is a one digit message tag, indicating whether the current message should be treated, as normal, private, urgent or private and urgent. Fields 48f–48k, containing twelve digits, indicate the date and time of when the message is sent. Fields 48l may include an ASCII message text subject having up to twenty-nine characters, and encoded into up to fifty-eight digits. A single DTMF digit delimiter ("#") in field 48m indicates the end of the ASCII subject field 48l. Finally a two digit checksum is sent in field 48n.

When the text propagation feature is not active for the session, as established by the session feature bitmap, no text data in field 48l is sent. Instead, field 48k is followed immediately by a delimiter in field 48m.

Once the recipient VM system has received frame 20, it acknowledges the message by returning a response frame including a response code to the sending VM system 100. Numerous values of this return code are understood. For example, a return code value RC2 indicates that the date in fields 48f–48k is invalid. An RC3 value indicates the message type in field 48c is invalid. An RC4 value indicates the subject in field 48l is invalid.

Once a message identifier frame 20 is sent and successfully acknowledged, a sender information frame 22, providing information about the sender of the present message is sent to the recipient VM system (FIG. 2). The sender is typically a user having an account on the sending VM system 100. The format of the sender information frame 22 is illustrated in FIG. 7. A sender information frame 22 comprises between thirteen and sixty-seven digits in ten fields 50a–50i.

Again, the first field of frame 22, field 50a indicates the length of the frame 22 in digits. Two digit field 50b, having a value of 60, identifies the frame as a sender information data frame. Field 50c indicates whether the sender should be treated as a remote voice user ("RVU") on the recipient system. The message sender is to be treated as an RVU on the recipient system if the value of 50c is non-zero. Specifically if the field contains a value of one, information, as for example contained in fields 50h (below), about the sender should be added to a remote user database on the recipient VM system. A value greater than one in this field indicates that a spoken version of the sender's name will be sent as part of the current message. Field 50d indicates the address type of the sender. Field 50e indicates the customer location number for the sender as supported by Nortel's Network Message System ("NMS") product. If the sending VM does not use this field will contain a zero value. Field 50f will contain a variable length sender voice mail box address having between two and eighteen digits followed by a delimiter (DTMF "#") in field 50g. Field 50h contains up to thirty eight digits forming an ASCII encoded version of the sender's name. As field 50h is of variable length, field 50i is a delimiter indicating the end of field 50h. Finally, field 50j contains a two digit checksum of frame 22.

If the text propagation feature is not supported for the session, as established by the session feature bitmap in field 42c, no text data in field 50h is sent. Instead, field 50g is followed immediately by the delimiter in field 50i. Similarly, in the event the RVU propagation feature is not supported, field 50c will contain a value of "0".

In response to a sender information frame 22, the recipient VM sends a response frame including a response code, indicating proper acceptance of the sender information frame 22. Numerous values of the response code are supported. For example, a response code RC2 indicates the address type is invalid. An RC3 indicates that the NMS location code does not match any location code defined for the sending VM system 100 in the recipient VM system database. An RC4 indicates that the sender's text name appears to be invalid. An RC5 indicates that the recipient VM encountered a problem adding or updating the sender as an RVU.

After sending a sender information frame 22, the sending VM system 100 sends either a voice frame 28, or a recipient information frame 24. The type of frame sent depends on whether or not voice data representing the message sender's spoken name is being sent, as indicated by a value of 2 in sender information frame 22, field 50c. If a sender's name is being sent audio data ("play/record voice") in frame 28 is played by the sending VM system 100. The recipient VM system records this. The end of the message is delimited by a DTMF "*" tone. If a delimiter does not follow before the expected message length (in field 48d), an error is detected by the recipient VM system. As will be appreciated, if RVU propagation is not supported for the session as indicated by the session feature bitmap in field 42c, no spoken name will be sent.

After a voice frame 28 containing the sender's spoken name is sent, (or immediately after the message identifier frame, in the event no sender spoken name is sent), a recipient information frame 24 is sent.

The format of this frame 24 is illustrated in FIG. 8. A recipient information frame 24 contains ten fields 52a–52j, containing between fifteen and sixty five digits of data. Two digit field 52a indicates the length of frame 24. Two digit field 52b, identifies the frame 24 as a recipient information frame with a value of 61 or 62. Two digit field 52c indicates the address type. Three digit field 52d contains the site identifier (between 001 and 500). Two digit field 52e contains the NMS location number (between 00 and 59) of the recipient VM system. If the recipient VM system does not support NMS then this value will always be 00. Variable length field 52f contains the recipient's voice mailbox number. This mailbox between two and eighteen digits. As such, the mailbox number is followed by a delimiter (DTMF "#") in field 52g. Thereafter, a DTMF encoded ASCII representation of the recipients name may be sent in field 52h. Field 50h is again a variable length field between zero and thirty-eight digits and is therefore followed by a delimiter (DTMF "#") in field 52i. Finally field 52j contains a two digit checksum for frame 24.

Once again, after a recipient information frame 24 is received, a response frame including response code is sent by the recipient VM system to the sending VM system 100. The response code may indicate an invalid address in field 52c (RC2); an NMS code that does not match the recipient VM system in field 52d; or an invalid recipient name in field 52h.

As illustrated in FIG. 1, a recipient information frame 24 is followed by another recipient information frame 24; a play/record voice frame 28; an attachment information frame 30; or a time stamp frame 26. The number of recipient information frames 24 for each message depends on the number of intended recipients on the recipient VM system of an identical sent message. Each recipient is identified by an individual recipient information frame 24. The last recipient information frame 24 for a message is identified by a value of 62 in field 52b. All other recipient information frames 24 are identified by a value of 61 in field 52b.

The format of time stamp frame 26 is illustrated in FIG. 9. A time stamp frame 26 has a length of sixteen digits in nine fields 54a–54i. Field 54a identifies the frame's length. Two digit field 54b identifies the field as a time stamp, with a value of 65. Fields 54c–54h identify the day, month, year, hour, minute, and second the subject message was originally sent. In the event multiple messages are associated with the time stamp, as for example with multiple attachments, fields 54a–54h identify the time the first associated message was originally sent. These are followed by a two digit checksum in field 54i.

Again, a response frame containing a response code is sent by the recipient to the sender, in response to a time stamp frame. The response code simply indicates that the date is invalid (RC2) or valid.

As illustrated in FIG. 2, after a time stamp frame 26 is sent, an NDN recipient information frame 32, an attachment information frame 30, or an end of message frame 34 is sent.

The format of an NDN recipient information frame 32 is illustrated in FIG. 10. An NDN recipient information frame 32 signifies non-delivery of a previously sent message, previously sent by the recipient VM system to the sending VM system 100. Effectively, the message is being returned to the recipient VM system with a non delivery notice ("NDN"). Frame 32 comprises between eleven and twenty-seven digits of data in seven fields 56a–56g. Two digit field 56a contains the length of frame 30. Two digit field 56b identifies the frame as an NDN recipient information frame with a value of 66 or 67. A function code of 66 indicates that the NDN is one of several to be sent. One NDN is sent for every user on the recipient system to whom the returned message was intended but not delivered. A function code of 67 in field 56b identifies the last of one or more NDN frames. Two-digit field 56c identifies the address type; two digit field 56d identifies the NMS location number; and variable length field 54e, having between two and eighteen digits, identifies the recipient mailbox number. Field 54f contains a delimiter (DTMF "#") indicating the end of the mailbox number in field 54e. As well, two digit field 54g contains a checksum for frame 32.

A response frame to an NDN recipient information frame 32, including response code is sent by the recipient VM system to the sending VM system 100. The response code may indicate that the address type of NMS codes are invalid (RC2 or RC3), or that the NDN frame was validly received.

An attachment information frame 30 is used to deliver one message that is attached to another, as part of a single message exchange between two VM systems. The format of an attachment information frame 30 is illustrated in FIG. 11. The attachment information frame 30 comprises six digits in four fields 58a–58f. Two digit field 58a contains the length 06 of frame 30. Two digit field 58b identifies the attachment information frame with a function code of 64. Two digit field 58c identifies the length of the voice attachment in minutes. Two digit field 58d is a checksum for the attachment information frame 30.

As shown in FIG. 2, an attachment information frame 30 may be sent after an NDN frame 32 (in the case of an undelivered attachment); after a time stamp frame 26; after a previous attachment frame 30 (in the event multiple attachments are forwarded); after a voice frame 28 (in the event a sender prefaces an attachment with another message); or directly after a recipient information frame 24. An attachment information frame 30 is followed by either a voice fame 28 or another attachment frame 30 in case no voice message is associated with the present attachment. After receipt of an attachment frame the recipient system sends a response frame.

Once a message is completely transferred, an end of message frame 34 is transferred. The format of this frame is in defined by the AMIS-A protocol.

Thereafter further messages may be sent commencing with a message detail frame 20. At the conclusion of message transfer, an end of session frame 36 also in accordance with the AMIS-A protocol is sent.

In operation, for example, an extended session, including the session feature bitmap, is established by sending VM system 100 and a recipient system. A regular message may be sent by VM system 100 after an extended session has been initiated by sending a message detail frame 20; followed by a sender information frame 22; followed by a voice frame 28 containing the sender name (in the event RVU propagation is supported); followed by one or more recipient information frames 24; followed by a voice frame 28; followed by an end of message frame 34.

Similarly, a message with one or more attachments (without RVU propagation) may be sent by sending VM system 100 as part of an exchange session by sending a message detail frame 22; a sender information frame 22; one or more recipient information frames 24; a voice frame 28; groups of one or more attachment 30 and voice 28 frames; followed by an end of message frame 34.

Of course, each frame in the operational examples would be acknowledged by response frames sent by the recipient VM system, as detailed above.

While the use of the session feature bitmap, as described, is limited to the support of Text Propagation, Network Broadcast and RVU propagation features of the VM systems, it will be appreciated that the session feature bitmap could easily be used for numerous other voice mail system features including support for attachments or NDN messages. Similarly, while the session bitmap is preferably exchanged in its entirety at the beginning of a session, it could be exchanged during the session as required. As illustrated, the presence or absence of a feature, as indicated by a session feature bitmap may affect which frames are transferred between VM system or which fields within frames are transferred thus providing great flexibility. This flexibility may be particularly valuable to enable message exchange between system offering a variety of different features not disclosed herein.

It will be further understood that the invention is not limited to the embodiments described herein which are merely illustrative of a preferred embodiment of carrying out the invention, and which are susceptible to modification of form, arrangement of parts, steps details and order of operation. The invention, rather, is intended to encompass all such modification within its spirit and scope, as defined by the claims.

We claim:

1. A method of exchanging voice mail messages between first and second voice mail systems, each voice mail message comprising frames of message data, said method comprising the steps of:

a. establishing a message exchange session between said first and second systems;

b. sending a first indicator of available voice mail system features at said first system, from said first system to said second system;

c. sending a second indicator of available voice mail features at said second system from said second system to said first system;

d. determining at said first and second systems a largest set of common features available at both said first and second systems; and e. exchanging frames of message data used only by features in said set of common features.

2. The method of claim 1, further comprising forming at said first system, a first system bitmap representative of features supported at said first system, said first system bitmap comprising a plurality of bits, each bit representing a feature supported at said first system.

3. The method of claim 2, further comprising forming at said second system, a second system bitmap representative of features supported at said second system, said second system bitmap comprising a plurality of bits, each bit representing a feature supported at said second system.

4. The method of claim 3, wherein step d. comprising logically ANDing bits in said first and second system bitmaps.

5. The method of claim 3, wherein step. b comprises sending said first system bitmap.

6. The method of claim 5, wherein step c. comprises forming a session bitmap at said second system by logically ANDing bits in said first and second system bitmaps; and sending said session bitmap from said second system to said first system.

7. The method of claim 6, wherein some message data is transferred using DTMF tones.

8. The method of claim 7, wherein said first system bitmap is converted to a first base ten bitmap, and said first base ten bitmap is sent using DTMF tones.

9. The method of claim 8, wherein said session bitmap is converted to a base ten session bitmap, and said base ten session bitmap is sent using DTMF tones.

10. A voice mail system, for interconnection with a second voice mail system, comprising an interface for connecting said voice mail system for communication with said second voice mail system;

a processor in communication with said interface, said processor adapted to exchange voice mail messages with said second voice mail system through said interface, said processor adapted to a. establish a message exchange session with said second voice mail system;

b. send a first indicator of available voice mail system features at said voice mail system, to said second voice mail system;

c. receive a second indicator of available voice mail features at said second voice mail system from said second voice mail system;

d. determine a largest set of common features available at both said voice mail systems and said second voice mail system; and e. exchange frames of message data used only by features in said set of common features with said second voice mail system.

11. The voice mail system of claim 10, wherein said processor is further adapted to form a first system bitmap representative of features supported at said voice mail system, said first system bitmap comprising a plurality of bits, each bit representing a feature supported at said voice mail system, and wherein said first indicator is formed from said system bitmap.

12. The voice mail system of claim 10, wherein said interface further comprises a DTMF tone generator for communicating with said second voice mail system.

13. The voice mail system of claim 10, wherein said interface is in communication with a DTMF tone generator.

* * * * *